United States Patent
Shao

(10) Patent No.: US 11,340,772 B2
(45) Date of Patent: May 24, 2022

(54) GENERATION DEVICE, GENERATION SYSTEM, IMAGE CAPTURING SYSTEM, MOVING BODY, AND GENERATION METHOD

(71) Applicant: SZ DJI TECHNOLOGY CO., LTD., Shenzhen (CN)

(72) Inventor: Ming Shao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 181 days.

(21) Appl. No.: 16/713,853

(22) Filed: Dec. 13, 2019

(65) Prior Publication Data
US 2020/0142580 A1   May 7, 2020

Related U.S. Application Data

(63) Continuation of application No. PCT/CN2018/115262, filed on Nov. 13, 2018.

(30) Foreign Application Priority Data

Nov. 28, 2017   (JP) .............................. JP2017-227627

(51) Int. Cl.
| | |
|---|---|
| *G06F 3/0485* | (2022.01) |
| *G06F 3/04855* | (2022.01) |
| *G06T 7/90* | (2017.01) |
| *B64C 39/02* | (2006.01) |
| *B64D 47/08* | (2006.01) |

(Continued)

(52) U.S. Cl.
CPC ........ *G06F 3/04855* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS

| | | | |
|---|---|---|---|
| 2008/0055683 A1 | 3/2008 | Choe et al. | |
| 2008/0123954 A1* | 5/2008 | Ekstrand | G06F 16/739 |
| | | | 382/173 |

(Continued)

FOREIGN PATENT DOCUMENTS

| | | |
|---|---|---|
| CN | 101690243 A | 3/2010 |
| CN | 102487456 A | 6/2012 |
| CN | 103559117 A | 2/2014 |
| CN | 103761303 A | 4/2014 |
| CN | 107122188 A | 9/2017 |

(Continued)

OTHER PUBLICATIONS

The World Intellectual Property Organization (WIPO) International Search Report for PCT/CN2018/115262 dated Jan. 30, 2019 7 Pages (including translation).

*Primary Examiner* — James M Anderson, II

(74) *Attorney, Agent, or Firm* — Anova Law Group, PLLC

(57) ABSTRACT

A device includes a memory storing a computer program and a processor configured to read the computer program to obtain a content including information acquired in a time sequence, extract characteristics at a plurality of time points from the information, determine a color or a brightness at each of the time points based on the characteristic at the time point, and generate drag bar images each corresponding to one of the time points and including a pixel having the color or the brightness at the one of the time points.

18 Claims, 10 Drawing Sheets

(51) Int. Cl.
*G06T 7/20* (2017.01)
*H04N 5/232* (2006.01)
*H04N 5/262* (2006.01)
*H04N 5/247* (2006.01)

(52) U.S. Cl.
CPC .................. *G06T 7/20* (2013.01); *G06T 7/90* (2017.01); *H04N 5/23203* (2013.01); *H04N 5/2628* (2013.01); *B64C 2201/027* (2013.01); *B64C 2201/127* (2013.01); *G06T 2200/24* (2013.01); *G06T 2207/10032* (2013.01); *H04N 5/247* (2013.01)

(56) References Cited

U.S. PATENT DOCUMENTS

| | | | | |
|---|---|---|---|---|
| 2014/0344730 | A1* | 11/2014 | Yoshiaki | H04N 21/8455 715/764 |
| 2018/0041733 | A1* | 2/2018 | Saptharishi | H04N 5/23296 |
| 2019/0130185 | A1* | 5/2019 | Delaney | G06F 16/739 |

FOREIGN PATENT DOCUMENTS

| | | | |
|---|---|---|---|
| JP | 2005018674 | A | 1/2005 |
| JP | 2013164667 | A | 8/2013 |
| JP | 2017152892 | A | 8/2017 |
| KR | 20050003210 | A | 1/2005 |
| WO | 2009008125 | A1 | 1/2009 |
| WO | 2010103868 | A1 | 9/2010 |
| WO | 2017145763 | A1 | 8/2017 |

\* cited by examiner

GENERATION DEVICE, GENERATION SYSTEM, IMAGE CAPTURING SYSTEM, MOVING BODY, AND GENERATION METHOD

CROSS-REFERENCE TO RELATED APPLICATIONS

This application is a continuation of International Application No. PCT/CN2018/115262, filed Nov. 13, 2018, which claims priority to Japanese Application No. 2017-227627, filed Nov. 28, 2017, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to a generation device, generation system, image capturing system, moving body (movable body), and generation method.

BACKGROUND

Patent Document 1 discloses a curved drag bar corresponding to the elevation, air pressure, temperature, and moving distance of an image capturing location.

Patent Document 1 is an international publication WO 2017/145763.

SUMMARY

In accordance with the disclosure, there is provided a device including a memory storing a computer program and a processor configured to read the computer program to obtain a content including information acquired in a time sequence, extract characteristics at a plurality of time points from the information, determine a color or a brightness at each of the time points based on the characteristic at the time point, and generate drag bar images each corresponding to one of the time points and including a pixel having the color or the brightness at the one of the time points.

Also in accordance with the disclosure, there is provided a system including the above device and a terminal. The terminal is configured to acquire the drag bar images corresponding to the time points, arrange the drag bar images in the time sequence to generate a drag bar corresponding to the content, and display the drag bar.

Also in accordance with the disclosure, there is provided a system including an image capturing device configured to capture a dynamic image and the above device. The content includes the dynamic image.

Also in accordance with the disclosure, there is provided a movable body including a propulsion system configured to drive the movable body to move, an image capturing device configured to capture a dynamic image, and an image generation device. The image generation device includes a memory storing a computer program and a processor configured to read the computer program to obtain a content including information acquired in a time sequence, extract characteristics at a plurality of time points from the information, determine a color or a brightness at each of the time points based on the characteristic at the time point, and generate drag bar images each corresponding to one of the time points and including a pixel having the color or the brightness at the one of the time points.

Also in accordance with the disclosure, there is provided a method including obtaining a content including information acquired in a time sequence, extracting characteristics at a plurality of time points from the information, determining a color or a brightness at each of the time points based on the characteristic at the time point, and generating drag bar images each corresponding to one of the time points and including a pixel having the color or the brightness at the one of the time points.

REFERENCE NUMERALS

Figure 1:
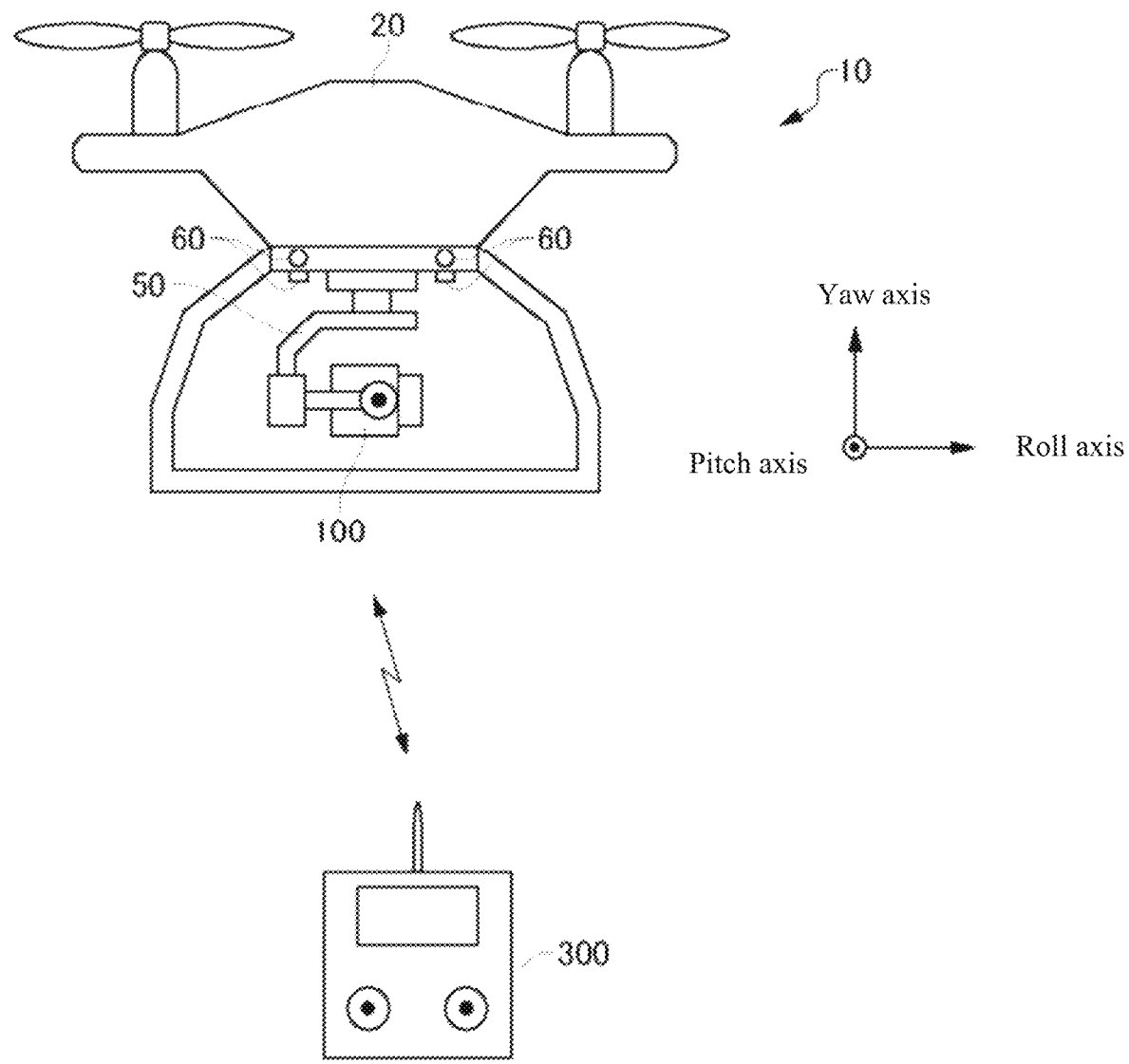
FIG. 1 is a schematic diagram showing the appearance of an unmanned aerial vehicle (UAV) and remote control device according to an example embodiment.

10—UAV
20—UAV main body
30—UAV controller
32—Memory
36—Communication interface
40—Propulsion system
41—GPS receiver
42—Inertial measurement unit (IMU)
43—Magnetic compass
44—Barometric altimeter
45—Temperature sensor
46—Humidity sensor
50—Gimbal
60—Image capturing device
100—Image capturing device 102—Imaging assembly
110—Imaging controller
120—Image sensor
130—Memory
200—Lens assembly
210—Lens
212—Lens driving member
214—Position sensor
220—Lens controller
222—Memory
300—Remote control device
400—Image generator
402—Acquisition circuit
404—Extraction circuit
406—Determination circuit
408—Generation circuit
500—Display apparatus
502—Acquisition circuit
504—Generation circuit
506—Display
600—Dynamic image
602—Snapshot
604, 604a, 604b, 604c, 604d—Drag bar image
610, 610A, 610B, 610C—Drag bar
700—Image
702—Snapshot
704—Drag bar
706—Icon
708—Icon
710—Operation button
1200—Computer
1210—Host controller
1212—CPU
1214—RAM
1220—Input/output controller
1222—Communication interface
1230—ROM

DETAILED DESCRIPTION OF THE EMBODIMENTS

The present disclosure will be described with the embodiments of the invention, but the following embodiments do not limit the invention according to the claims. Other embodiments of the disclosure will be apparent to those skilled in the art from consideration of the specification and practice of the embodiments disclosed herein. It is intended that the specification and embodiments be considered as example only and not to limit the scope of the disclosure, with a true scope and spirit of the invention being indicated by the claims.

The embodiments of the present disclosure can be described with reference to flowcharts and block diagrams. A block may represent: (1) a stage of a process of implementing an operation, or (2) a "unit" of a device having a role of implementing an operation. Some specific stages and "unit" can be implemented by programmable circuits and/or processors. Some specific circuits may include digital and/or analog hardware circuits, integrated circuits (ICs) and/or discrete circuits. Programmable circuits can be reconfigurable hardware circuits that may include a logical circuits, such as logical AND, logical OR, logical XOR, logical NAND, and/or logical NOR, flip-flops, registers, field programmable gate arrays (FPGAs), and programmable logic arrays (PLAs), etc.

The computer-readable medium may include any tangible device that can store instructions executed by a suitable device. The computer-readable medium with the instructions stored thereon has a product including instructions that can be executed to create a means for implementing the operations specified by the flowchart or block diagram. The computer-readable medium may include an electronic storage media, a magnetic storage media, an optical storage media, an electromagnetic storage media, and a semiconductor storage media, etc. A more specific example as a computer-readable medium can include a floppy disk (registered trademark), floppy disk, hard disk, random access memory (RAM), read-only memory (ROM), erasable programmable read-only memory (EPROM or flash memory), electrically erasable programmable read-only memory (EEPROM), static random access memory (SRAM), compact disc read-only memory (CD-ROM), digital versatile disc (DVD), Blu-ray® disc, memory stick, integrated circuit card, etc.

Computer-readable instructions may include any one of the source code or object code described by any combination of one or more programming languages. The source and object code can be traditional procedural programming languages that may include assembly instructions, instruction set architecture (ISA) instructions, machine instructions, machine-related instructions, microcode, firmware instructions, state setting data, or object programming languages and "C" programming language or similar such as Smalltalk and C++, etc. Computer-readable instructions can be provided locally or via a wide area network (WAN) such as a local area network (LAN) or the Internet to a processor or programmable circuit of a general-purpose computer, special-purpose computer, or other programmable data processing device. A process or programmable circuit can execute computer-readable instructions to create a means for implementing the operations specified in the flow chart or block diagram. Examples of the processor include a computer processor, a processing unit, a microprocessor, a digital signal processor, a controller, a microcontroller, etc.

FIG. 1 is a schematic diagram showing an unmanned aerial vehicle (UAV) 10 and a remote control device 300. The UAV 10 includes a UAV main body 20, a gimbal 50, multiple image capturing devices 60, and an image capturing device 100. The gimbal 50 and the image capturing device 100 are example parts of an image capturing system. UAV 10 is an example of movable body, which can include an aerial body moving in the air, a vehicle moving on the ground, or a ship moving on the water, etc. An aerial body moving in the air can include not only a UAV but also another type such as an aircraft, an airship, or a helicopter, etc. that can move in the air.

The UAV main body 20 includes two or more rotors. The two or more rotors are an example of a propulsion system. The UAV main body 20 drives the UAV 10 to fly by controlling the rotation of the two or more rotors. In some embodiments, the main body 20 drives the UAV 10 fly using four rotors. The number of rotors is not limited to four. The UAV 10 can also be a fixed-wing aircraft without rotors.

The image capturing device 100 can be an image capturing camera for imaging an object included in a desired image capturing range. The gimbal 50 can rotatably support the image capturing device 100. The gimbal 50 is an example of a support mechanism. For example, the gimbal 50 uses an actuator to rotatably support the image capturing device 100 around a pitch axis. The gimbal 50 uses actuators to further rotatably support the image capturing device 100 around the roll axis and the yaw axis, respectively. The gimbal 50 can change the attitude of the image capturing device 100 by rotating the image capturing device 100 around one or more of the yaw axis, the pitch axis, and the roll axis.

The multiple image capturing devices 60 are sensing cameras for imaging the surroundings of the UAV 10 to control the flight of the UAV 10. Two image capturing devices 60 can be installed on the head of the UAV 10, that is, in the front. The other two image capturing devices 60 can be installed on the bottom of the UAV 10. The two image capturing devices 60 in the front can be paired and function as a stereo camera. The two image capturing devices 60 on the bottom can also be paired and function as a stereo camera. Three-dimensional spatial data around the UAV 10 can be generated based on the images captured by the multiple image capturing devices 60. The number of the image capturing devices 60 included in the UAV 10 is not limited to four. In some embodiments, the UAV 10 can only have at least one image capturing device 60. In some other embodiments, the UAV 10 may also have at least one image capturing device 60 at each of the head, tail, side, bottom, and top of the UAV 10. The angle of view of the image capturing device 60 can be greater than the angle of view of the image capturing device 100. The image capturing device 60 can also have a single focus lens or a fisheye lens.

The remote control device 300 can communicate with the UAV 10 to remotely operate the UAV 10. The remote control device 300 can communicate with the UAV 10 wirelessly. The remote control device 300 can send the UAV 10 instruction information indicating various instructions related to the movement of the UAV 10 such as ascent, descent, acceleration, deceleration, forward, backward, and rotation, etc. In some embodiments, the instruction information can include instruction information for raising the height of the UAV 10. Specifically, the instruction information can indicate the height at which the UAV 10 should be located, and the UAV 10 moves to the height indicated by the instruction information received from the remote control device 300. The instruction information can include an ascent instruction to cause the UAV 10 to ascend. The UAV 10 ascends while receiving the ascent instruction. When the height of the UAV 10 has reached the upper limit, the UAV 10 can limit the ascent even if it receives the ascent instruction.

Figure 2:
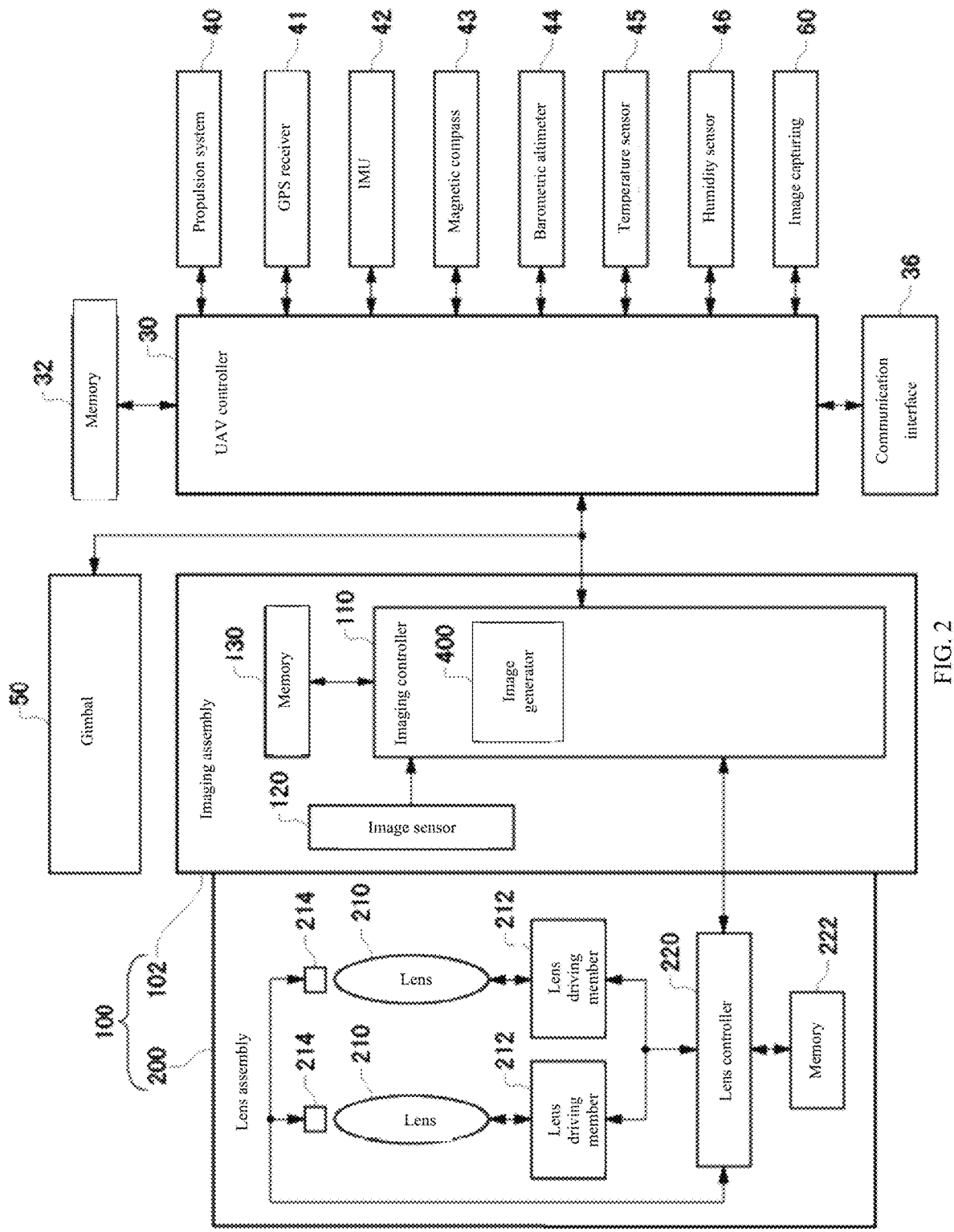
FIG. 2 is a schematic structural diagram of a UAV according to an example embodiment.

FIG. 2 shows an example structural diagram of the UAV 10. The UAV 10 includes a controller 30, a memory 32, a communication interface 36, a propulsion system 40, a GPS receiver 41, an inertial measurement unit (IMU) 42, a magnetic compass 43, a barometric altimeter 44, a temperature sensor 45, a humidity sensor 46, a gimbal 50, the image capturing device 60, and the image capturing device 100.

The communication interface 36 communicates with other devices such as the remote control device 300. The communication interface 36 can receive the instruction information including various instructions to the UAV controller 30 from the remote control device 300. The memory 32 is configured to store the computer programs needed for the UAV controller 30 to control the propulsion system 40, the GPS receiver 41, the inertial measurement unit 42, the magnetic compass 43, the barometric altimeter 44, the temperature sensor 45, the humidity sensor 46, the gimbal 50, the image capturing device 60, and the image capturing device 100. The memory 32 can be a computer-readable storage medium, and may include at least one of the flash memories such as SRAM, DRAM, EPROM, EEPROM, and USB memory. The memory 32 can be configured inside the UAV main body 20 and can be configured to be detachable from the UAV main body 20.

The UAV controller 30 controls the flight and the image capturing of the UAV 10 in accordance with the program stored in the memory 32. The UAV controller can include a microprocessor such as a CPU or an MPU, or a microcontroller such as an MCU. The UAV controller 30 controls the flight and image capturing of the UAV 10 in accordance with the instructions received via the communication interface 36 from the remote control device 300. The UAV 10 is driven by the propulsion system 40. Specifically, the propulsion system 40 includes two or more rotors and two or more drive motors for rotating the two or more rotors. The propulsion system 40 can further make the UAV 10 fly by rotating the two or more rotors through the two or more drive motors in accordance with the instruction from the UAV controller 30 10.

The GPS receiver 41 can receive two or more signals indicating the time transmitted from two or more GPS satellites, and calculate the position (latitude and longitude) of the GPS receiver 41, that is, the position (latitude and longitude) of the UAV 10 based on the received two or more signals. The IMU 42 can detect the attitude of the UAV 10. Specifically, the IMU 42 can detect the attitude of the UAV 10, including accelerations of the UAV 10 in front-back, left-right, and up-down directions, and angular velocities of the UAV 10 about the pitch axis, the roll axis, and the yaw axis. The magnetic compass 43 can detect the orientation of the head of the UAV 10. The barometric altimeter 44 can detect the flight altitude of the UAV 10. Specifically, the barometric altimeter 44 detects the air pressure around the UAV 10, and converts the detected air pressure into an altitude that to detect the altitude of the UAV 10. The temperature sensor 45 can detect the temperature around the UAV 10. The humidity sensor 46 can detect the humidity around the UAV 10.

The image capturing device 100 includes an imaging assembly 102 and a lens assembly 200, where the lens assembly 200 is an example of a lens apparatus. The imaging assembly 102 includes an image sensor 120, an imaging controller 110 and a memory 130. The image sensor 120 can include a CCD sensor or a CMOS sensor. The image sensor 120 captures an optical image formed through two or more lenses 210 and outputs the captured image data to the imaging controller 110 that can be composed of a microprocessor such as a CPU or an MPU, and a microcontroller such as an MCU. The imaging controller 110 can control the image capturing device 100 based on an operation instruction of the image capturing device 100 from the UAV controller. The memory 130 can be a computer-readable storage medium, and may include at least one of the flash memories such as SRAM, DRAM, EPROM, EEPROM, and USB memory. The memory 130 is configured to store the computer programs needed for the imaging controller 110 controlling the image sensor 120, etc. The memory 130 can be arranged inside the casing of the image capturing device 100 and can be configured to be detachable from the casing of the image capturing device 100.

The lens assembly 200 can include two or more lenses 210, two or more lens driving member 212, and a lens controller 220. The two or more lenses 210 can function as a zoom lens, a manual zoom lens, and a focusing lens. At least some or all of the two or more lenses 210 are configured to move along an optical axis of the two or more lenses 210. The lens assembly 200 can be an interchangeable lens configured to removable from the imaging assembly 102. The lens driving member 212 can move at least some of the two or more lenses 210 along an optical axis via a mechanism such as a cam ring, etc. The lens driving member 212 can include an actuator and the actuator can include a stepper motor. The lens controller 220 drives the lens driving member 212 in accordance with a lens control instruction from the imaging assembly 102, and can move one or more lenses 210 along the optical axis direction via a mechanism. In some embodiments, the lens control instruction can be a zoom control instruction and a focus control instruction.

The lens assembly 200 can further include a memory 222 and a position sensor 214. The lens controller 220 moves the lenses 210 along the optical axis direction via the lens driving member 212 in accordance with a lens action instruction from the imaging assembly 102. Some or all of the lens 210 can move along the optical axis, and the lens controller 220 can implement at least one of the zoom operation and the focus operation by moving at least one of the lenses 210 along the optical axis. The position sensor 214 can detect the position of the lens 210, and also a current zoom position or a focus position.

The lens driving member 212 may include a vibration correction mechanism and the lens controller 220 can perform the vibration correction by moving the lens 210 in the direction along the optical axis or the direction perpendicular to the optical axis via the vibration correction mechanism. The vibration correction mechanism can be driven using a step motor by the lens driving member 212 in order to implement vibration correction. Specifically, the vibration correction mechanism can be driven by a step motor to move the image sensor 120 in the direction along the optical axis or in the direction perpendicular to the optical axis to implement vibration correction.

The memory 222 is configured to store control values of the two or more lenses 210 moved through the lens driving member 212. The memory 130 can be a computer-readable storage medium, and may include at least one of the flash memories such as SRAM, DRAM, EPROM, EEPROM, and USB memory.

In some embodiments, when the image captured by the above described image capturing device 100 mounted at the UAV 10 is displayed on a display device arranged at the example remote control device 300, a user can operate the remote control device 300 to control the UAV 10 and the image capturing device 100. By referring to the image displayed on the display device, the user can have an idea of the state of the current image captured by the image capturing device 100.

In the conventional technologies, it is difficult to grasp the transition of the images captured by the image capturing device 100. For example, it is difficult to visually grasp the dynamic image being captured from the start time point to the current time point of the dynamic image capturing of the image capturing device 100. According to embodiments of the present disclosure, it is easy to visually grasp the transition of the image captured by the image capturing device 100.

The imaging controller 110 includes an image generator 400. In some other embodiments, the image generator 400 can be included as a part of another device such as the UAV controller 30, the remote control device 300, or a server connected to the UAV 10 via a network.

Figure 3:
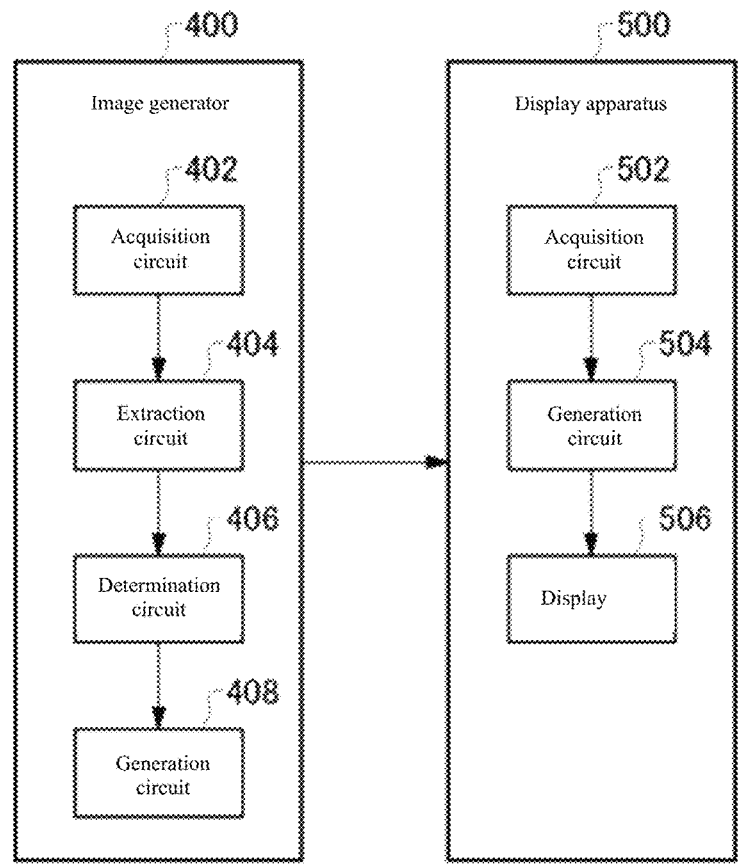
FIG. 3 is a schematic structural diagram of a generation system that generates drag bars according to an example embodiment.

FIG. 3 is a schematic diagram showing the functional modules of a generation system that generates drag bars according to an example embodiment. The generation system includes an image generator 400 and a display apparatus 500. The image generator 400 includes an acquisition circuit 402, an extraction circuit 404, a determination circuit 406, and a generation circuit 408. The display apparatus 500 is an example of a terminal and can be configured on the remote control device 300, for example.

The acquisition circuit 402 is an example of the first acquisition circuit and can acquire the content including information acquired in time sequence. In some embodiments, the content acquired can include the dynamic image captured by the image capturing device 100. In some embodiments, the information acquired in time sequence can be two or more static images that constitute the dynamic image captured by the image capturing device 100, where the static images can be snapshots taken at predetermined intervals from the dynamic image, or an image displayed on the display apparatus 500 as a preview image. The content can further include audio data, slide data that sequentially displays a series of images, etc.

The extraction circuit 404 extracts characteristics at each of the two or more time points from the information at each of the two or more time points. In some embodiments, the extraction circuit 404 can extract a characteristics at each of the two or more time points from the static images at the two or more time points of the dynamic image. In some embodiments, the extraction circuit 404 can extract characteristics at each of the two or more time points from the pixel values of the static images at the two or more time points. In some embodiments, the extraction circuit 404 can extract characteristics at each of the two or more time points from the pixel value of each pixel in the horizontal direction of the static images at the two or more time points, where the horizontal direction is an example of the first direction.

The determination circuit 406 determines the color or the brightness of each of the two or more time points based on the characteristics of each of the two or more time points. In some embodiments, the determination circuit 406 can determine the color or the brightness of each of the two or more time points based on the pixel values of the static images at the two or more time points, where the pixel value can include R, G, and B components. In some embodiments, the determination circuit 406 can determine the color or the brightness of each of the two or more time points by averaging the pixel value of each pixel in the horizontal direction of the static images at the two or more time points. In some embodiments, the determination circuit 406 can determine the color or the brightness by averaging the pixel values of pixels included in a predetermined range among the pixels in the horizontal direction of the static image. For example, the determination circuit 406 can determine the color or the brightness by averaging the pixel values of pixels included in the central range of the static image among the pixels in the horizontal direction of the static image. In some embodiments, the determination circuit 406 can determine the color or the brightness based on the pixel value of the pixel at a predetermined position in the horizontal direction of the static image.

The generation circuit 408 can arrange the contents in time sequence to generate a drag bar corresponding to the contents. The generation circuit 408 generates the drag bar image at each of the two or more time points, where the image also includes the pixels of the color or the brightness determined by the determination circuit 406. The generation circuit 408 is an example of the first generation circuit. In some embodiments, the generation circuit 408 can replace the pixels in the horizontal direction of the static image with a predetermined number of pixels with the color or the brightness determined by the determination circuit 406, and then compress the pixels in the vertical direction of the static image at a predetermined compression ratio, hence generate the drag bar image at each of the two or more time points.

In some embodiments, the generation circuit 408 can replace the pixels in the horizontal direction of the static image with one pixel with the color or the brightness determined by the determination circuit 406, and then compress the pixels in the vertical direction of the static image at a predetermined compression ratio, hence generate the drag bar image at each of the two or more time points. The generation circuit 408 can generate an image of a predetermined size composed of pixels with the color and the brightness determined by the determination circuit 406 as the drag bar image.

The display apparatus 500 includes an acquisition circuit 502, a generation circuit 504, and a display 506. In some embodiments, the display apparatus 500 can be arranged at the remote control device 300. The acquisition circuit 502 is an example of the second acquisition circuit and can acquire the drag bar image generated by the generation circuit 408. The acquisition circuit 502 may sequentially acquire a snapshot of a dynamic image captured by the image capturing device 100 and an image of a drag bar corresponding to the snapshot.

The generation circuit 504 can arrange the image at each time point of two or more time points corresponding to the drag bar in a time sequence, and then generate a drag bar corresponding to the content. The drag bar shows the transition of the content visually. In some embodiments, the drag bar can express a bar image of the whole or at least a part of the dynamic image captured by the image capturing device 100 through the color or the brightness corresponding to the characteristic at each time point. In some embodiments, the drag bar can be a bar image representing the playback position of the content. The generation circuit 504 is an example of the second generation circuit. In some embodiments, the generation circuit 504 can generate a drag bar that includes the information indicating the position of the time point when the status of the content is switched. In some embodiments, the generation circuit 504 can generate a drag bar that includes the information indicating the position of the transition point of the content. In some embodiments, the generation circuit 504 can generate a drag bar that includes the information indicating a position of a time point of scene switching of the content. In some embodiments, the generation circuit 504 can generate a drag bar that includes the information indicating a position of a time point of scene switching of a dynamic image. The generation circuit 504 may determine the time point when the state of the content is switched by comparing the adjacent images corresponding to the drag bar, or by comparing the pixel values of the adjacent images corresponding to the drag bar. For example, when the difference between the average value of the pixel values of the pixels constituting the first drag bar image and the average value of the pixel values of the pixels constituting the second drag bar image that is adjacent to the first drag bar image changes above a predetermined threshold, the generation circuit 504 can determine that the time point between the first drag bar image and the second drag bar image is the time point when the state of the content is switched. In some embodiments, the generation circuit 504 can also determine that the time point at which the color or the brightness of the drag bar image changes is the time point when the state of the content is switched.

Figure 4A:
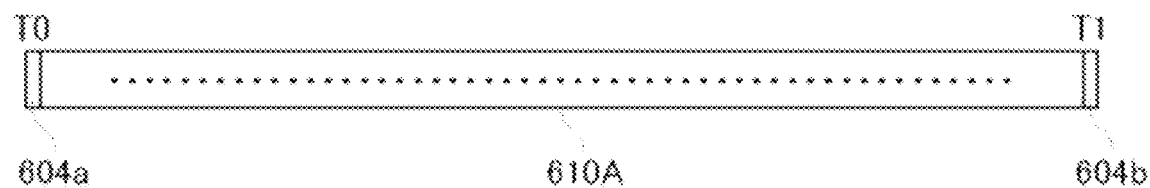
FIG. 4A is a schematic diagram showing a drag bar according to an example embodiment.
Figure 4B:
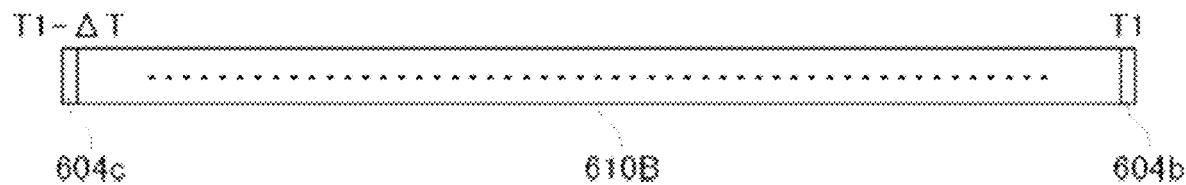
FIG. 4B is a schematic diagram showing a drag bar according to an example embodiment.
Figure 4C:
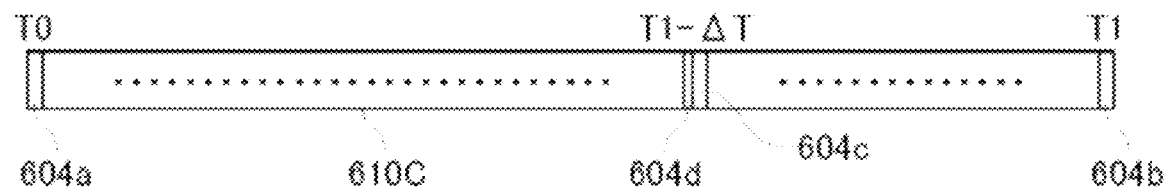
FIG. 4C is a schematic diagram showing a drag bar according to an example embodiment.

In some embodiments, as shown in FIG. 4A, when a dynamic image is captured by the image capturing device 100 from a first time point T0 to a second time point T1, the generation circuit 504 can generate a drag bar 610A. One end of the drag bar 610A is a drag bar image 604a corresponding to the static image at the first time point T0 in the dynamic image, and the other end of the drag bar 610A is a drag bar image 604b corresponding to the static image at the second time point T1 in the dynamic image. In some embodiments, as shown in FIG. 4B, the generation circuit 504 can generate a drag bar 610B. One end of the drag bar 610B is a drag bar image 604c corresponding to the static image at a third time point (T1-ΔT) in the dynamic image. The third time point (T1-ΔT) is a time point between the first time point T0 and the second time point T1 that is a predetermined period ΔT before the second time point T1. The other end of the drag bar 610B is the drag bar image 604b corresponding to the static image at the second time point T1 in the dynamic image. In some embodiments, as shown in FIG. 4C, the generation circuit 504 can generate a drag bar 610C. One end of the drag bar 610C is the drag bar image 604a corresponding to the static image at the first time point T0 in the dynamic image. The other end of the drag bar 610C is the drag bar image 604b corresponding to the static image at the second time point T1 in the dynamic image. At a predetermined part between the two ends is the drag bar image 604c corresponding to the static image at the third time point (T1-ΔT) in the dynamic image. The generation circuit 504 can generate the drag bar 610C by further compressing in the horizontal direction starting from the drag bar image 604a corresponding to the static image at the first time point T0 to a drag bar image 604d just before the third time point (T1-ΔT).

In some embodiments, the generation circuit 504 can arrange the drag bar images of the snapshots in time sequence from the start time point at which the image capturing device 100 starts to capture the dynamic image to the current time point, and generate the drag bar. In some embodiments, the generation circuit 504 can arrange the drag bar images of the snapshots in time sequence from a time point that is before a predetermined period from the time point at which the image capturing device 100 starts to capture the dynamic image to the current time point, and generate the drag bar. In some embodiments, the generation circuit 504 generating the drag bar can include, further compressing the drag bar images of the snapshots of the dynamic image captured by the image capturing device 100 in the horizontal direction from the time point at which the image capturing device 100 starts to capture the dynamic image to a time point that is before a predetermined period from the current time point, and arranging the drag bar images of the snapshots in time sequence from a time point that is before a predetermined period from the time point at which the image capturing device 100 starts to capture the dynamic image to the current time point without compressing.

The display 506 can display the drag bar generated by the generation circuit 504. In some embodiments, the display 506 can arrange and display the snapshots and the drag bars. In some embodiments, the display 506 can display the drag bar while displaying the snapshot of the dynamic image captured by the image capturing device 100 as a preview image. The display 506 can display the drag bar below or above the snapshot.

Figure 5:
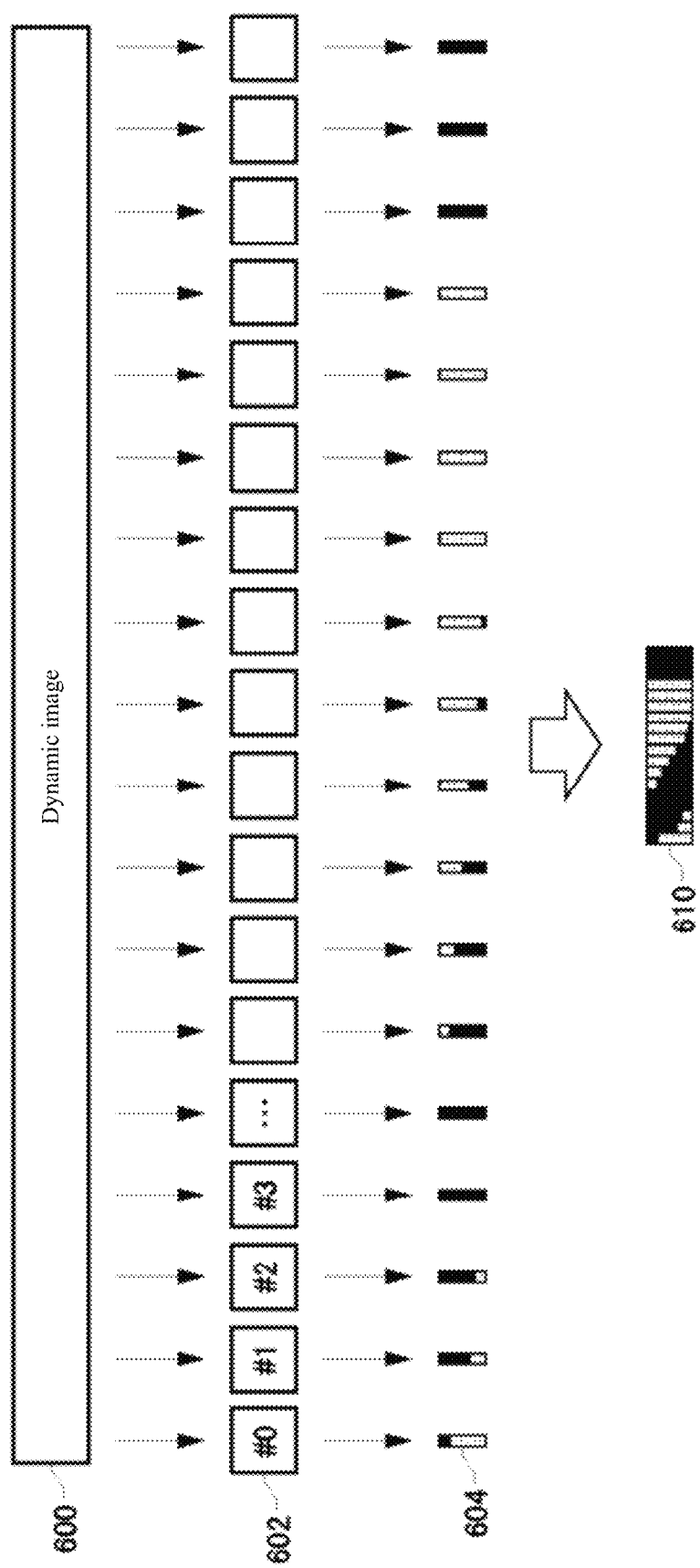
FIG. 5 is a schematic diagram showing the process of generating a drag bar from a dynamic image according to an example embodiment.

In some embodiments, as shown in FIG. 5, the acquisition circuit 402 acquires the snapshot 602 that is extracted from the dynamic image 600 at a predetermined interval. The extraction circuit 404 extracts the characteristics of the snapshot 602. In some embodiments, the extraction circuit 404 can extract the characteristics of the snapshot 602 by extracting the pixel value of each pixel in the horizontal direction of the snapshot 602.

The determination circuit 406 can extract the characteristics of the snapshot 602 by averaging the pixel values of each pixel in the horizontal direction of the snapshot 602. In some embodiments, the generation circuit 408 can generate the drag bar image 604 by replacing pixels in the horizontal direction of the snapshot 602 with one pixel with an average pixel value and compressing pixels in the vertical direction of the snapshot 602 with a predetermined compression ratio. In some embodiments, the generation circuit 408 can average the pixel values of the pixels in the vertical direction of the snapshot 602 for each predetermined number of pixels, perform compression, and generate the drag bar image 604. In some embodiments, the generation circuit 408 can extract the pixels in the vertical direction of the snapshot 602 by every predetermined number, perform compression, and generate the drag bar image 604. The generation circuit 504 can arrange the drag bar images 604 generated by the generation circuit 408 in time sequence to generate the drag bar 610.

Figure 6:
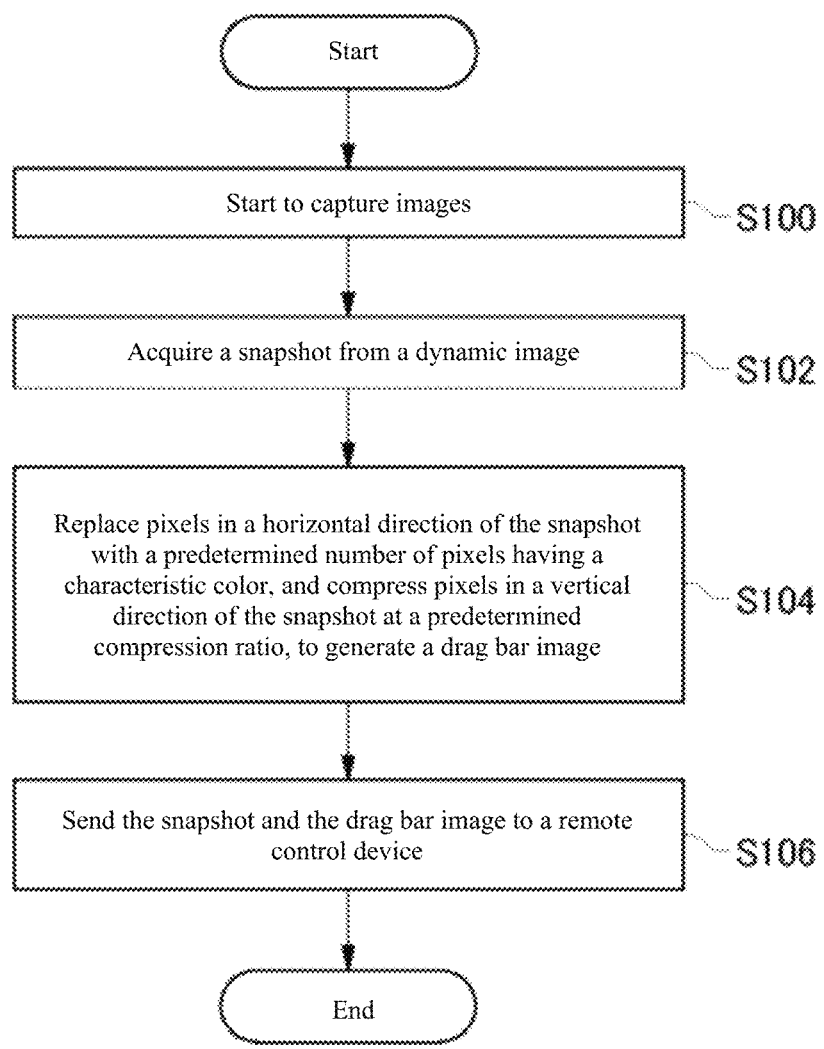
FIG. 6 is a schematic flow chart of the process of generating a drag bar image according to an example embodiment.

FIG. 6 is a schematic flow chart showing the image generator 400 generating the drag bar image. Specifically, the image capturing device 100 starts to capture images (S100). For example, when receiving a recording start instruction from a user via the remote control device 300, the image capturing device 100 can start to capture dynamic images. The acquisition circuit 402 acquires snapshots extracted at predetermined intervals from the dynamic image captured by the image capturing device 100 (S102). The extraction circuit 404 extracts the characteristic of the snapshots by extracting the pixel value of each pixel in the horizontal direction of the snapshots. The determination circuit 406 averages the pixel values of the pixels in the horizontal direction of the snapshots to determine the characteristic colors of the snapshots in each horizontal direction. The generation circuit 408 replaces the pixels in the horizontal direction of the snapshot with the predetermined number of pixels having a characteristic color, compresses the pixels in the vertical direction of the snapshot at a predetermined compression ratio, and generates the drag bar image (S104). The image generator 400 sends the snapshots and the drag bar images corresponding to the snapshots to the remote control device 300 via the communication interface 36 (S106).

Figure 7:
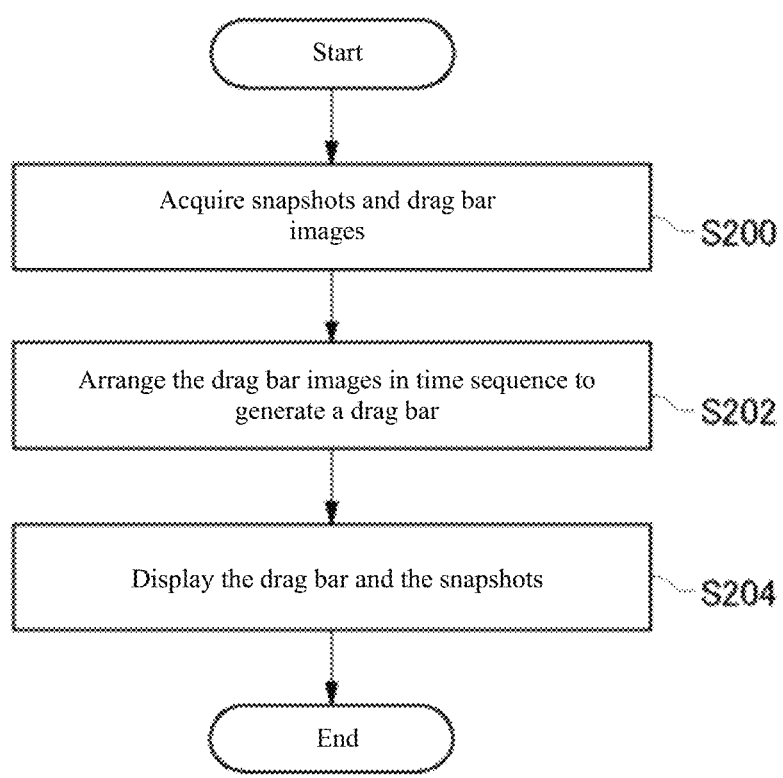
FIG. 7 is a schematic flow chart of the process of generating a drag bar from a drag bar image according to an example embodiment.

FIG. 7 is a schematic flow chart showing the process of the display apparatus 500 displaying the drag bar. The acquisition circuit 502 acquires the snapshot and the drag bar image corresponding to the snapshot from the image generator 400 (S200). The generation circuit 504 sequentially arranges the drag bar images acquired by the acquisition circuit 502 in time sequence to generate the drag bar (S202). The generation circuit 504 can generate the drag bar by connecting the newly acquired drag bar image to one end of the drag bar created so far. If the length of the drag bar is a predetermined length, each time a newly acquired drag bar image is added to the existing drag bar, the generation circuit 504 can compress the drag bar image in the drag bar in the horizontal direction. The display 506 arranges and displays the drag bar and the snapshot (S204).

Figure 8:
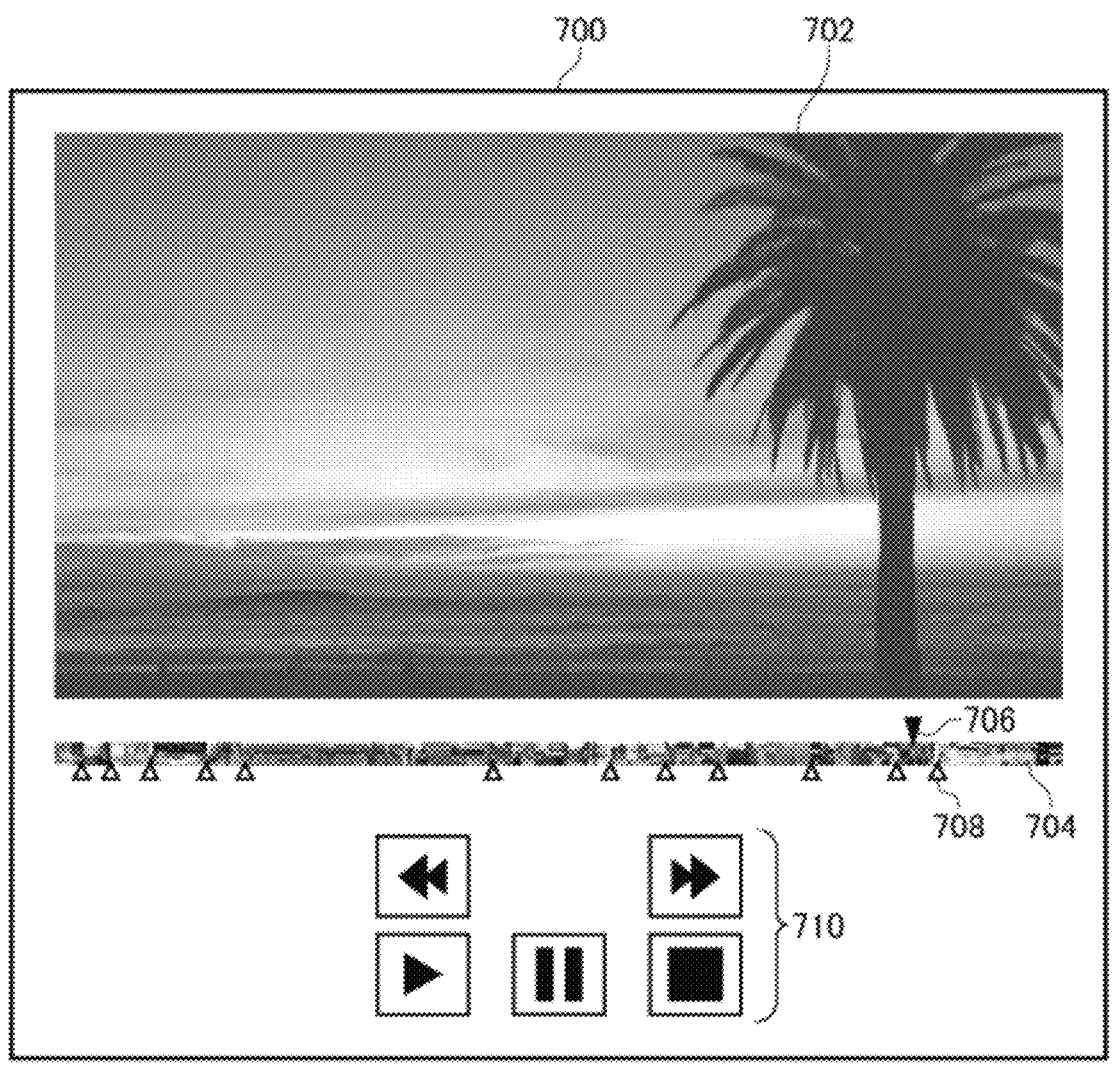
FIG. 8 is an example diagram showing an image including a drag bar according to an example embodiment.

FIG. 8 is an example diagram showing the drag bar and the snapshot displayed at the display 506. The display 506 can be, e.g., a touch display. The image 700 includes a preview image (i.e., a snapshot 702), a drag bar 704, and operation buttons 710. The operation buttons 710 can include buttons for operating, such as playing back, stopping, pausing, rewinding, and fast forwarding, etc., the dynamic image received from the user corresponding to the snapshot 702 captured by the image capturing device 100.

The drag bar 704 includes an icon 706 indicating a playback position of the dynamic image and an icon 708 indicating a position of a time point of the scene switching of the dynamic image. The generation circuit 504 can determine the time point of the scene switching of the dynamic image based on the pixel value of the drag bar image, and generate a drag bar 704 that includes the icon 708 corresponding to the time point. When the pixel value of the drag bar image changes above a predetermined threshold, the generation circuit 504 can determine the time point of the scene switching of the dynamic image, and generate the drag bar 704 that includes the icon 708 corresponding to the time point. In some embodiments, the generation circuit 504 can determine the time point at which the characteristic color of the drag bar image is switched as the time point of the scene switching of the dynamic image, and generate the drag bar 704 that includes the icon 708 corresponding to the time point.

The dynamic images captured by the image capturing device 100 can be sequentially stored in the memory 130 or the memory 32 on the side of the UAV 10, and snapshots of the dynamic image and drag bar images can be sequentially transmitted to the remote control device 300. In some embodiments, the dynamic image captured by the image capturing device 100 is stored in another device such as the remote control device 300, etc. The remote control device 300 and the other device can generate and display the drag bar at the stage of playing the stored dynamic image, where the snapshots and the drag bar images of the dynamic image are arranged in time sequence.

Figure 9:
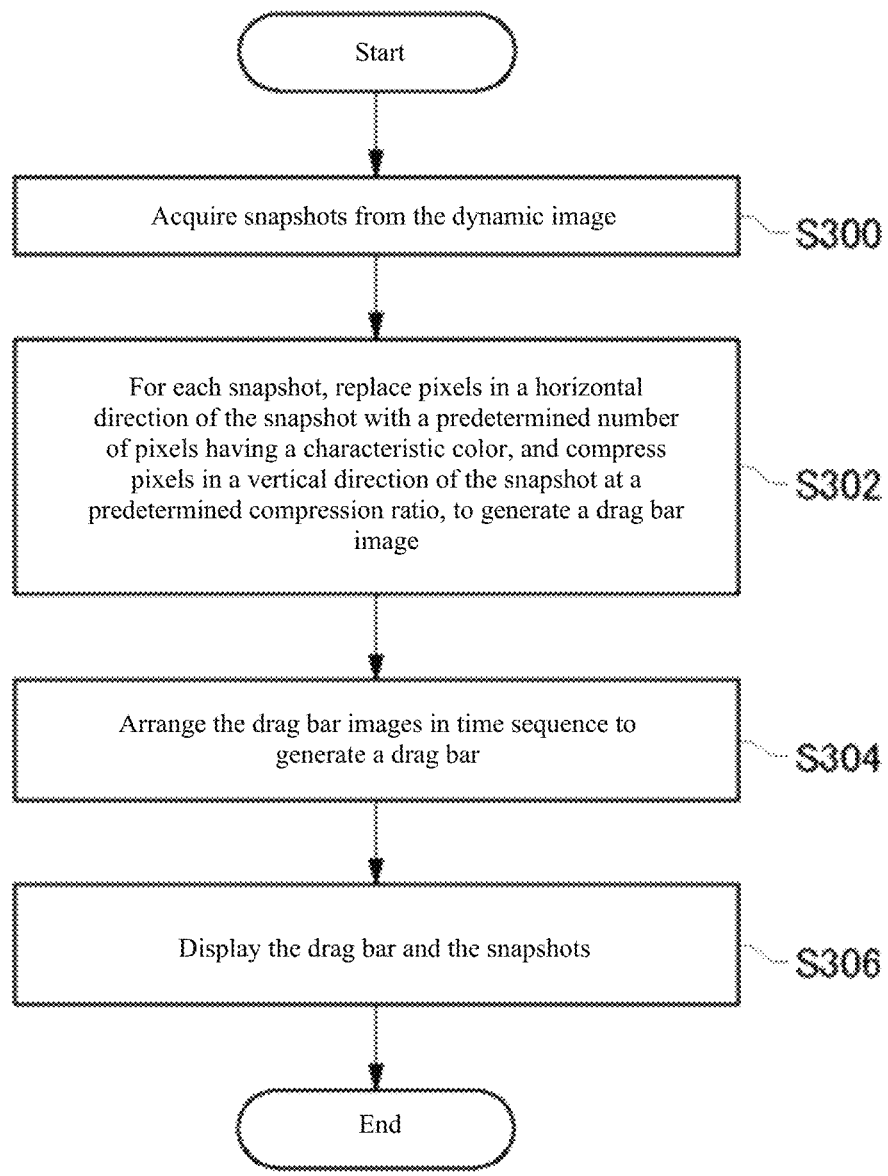
FIG. 9 is a schematic flow chart of the process of generating a drag bar from a dynamic image according to an example embodiment.

FIG. 9 is a schematic flow chart of the process of generating a drag bar from a dynamic image according to an example embodiment. Specifically, generation of the drag bar from the dynamic image can be implemented by a device that performs operations such as playing, editing, etc., on the dynamic image. The device can have a structure that is the same as or similar to, e.g., the structure shown in FIG. 3.

As shown in FIG. 9, the acquisition circuit 402 acquires snapshots extracted at predetermined intervals from the dynamic image (S300). The extraction circuit 404 extracts the characteristic of the snapshots by extracting the pixel value of each pixel in the horizontal direction of the snapshots. The determination circuit 406 averages the pixel value of each pixel in the horizontal direction of the snapshots to determine the characteristic colors of the snapshots in each horizontal direction. The generation circuit 408 replaces the pixels in the horizontal direction of the snapshot with the predetermined number of pixels having a characteristic color, compresses the pixels in the vertical direction of the snapshot at a predetermined compression ratio, and generates the drag bar image (S302). The generation circuit 504 arranges the drag bar images generated by the generation circuit 408 in time sequence and generate the drag bar (S304). The display 506 arranges and displays the drag bar and the snapshot (S306).

In accordance with the embodiment described above, there is provided a drag bar, where drag bar images having color or brightness corresponding to each characteristic of a snapshot of a dynamic image are arranged in time sequence. It is easy to visually grasp the transition of the dynamic image captured by the image capturing device 100 by providing the drag bar that includes the image of the color or the brightness corresponding to the characteristic.

In the embodiments described above, a pixel value of a static image (snapshot) is extracted as a characteristic at each time point of the two or more time points. In some other embodiments, the extraction circuit 404 can also extract parameters other than pixel values from the information acquired in time sequence such as static images. In some embodiments, the extraction circuit 404 can extract the color or the brightness of the object that satisfies a predetermined condition among the static images at the two or more time points as the characteristic at each time point of the two or more time points. In some embodiments, the extraction circuit 404 can derive the color or the brightness distribution of the object that satisfies a predetermined condition, and extract the color or the brightness with highest distribution rate as a representative color or brightness of the object, and as the characteristic at each time point of the two or more time points. In some embodiments, the extraction circuit 404 can extract a moving object from the static image, and extract the color or the brightness of the moving object as the characteristic of the static image. In some embodiments, the extraction circuit 404 can extract a person from the static image, and extract the skin color of the person or the color of the clothes of the person as the characteristic of the static image.

In some embodiments, the extraction circuit 404 can extract the action states of the object that satisfies a predetermined condition among the static images at the two or more time points as the characteristic at each time point of the two or more time points. Specifically, the extraction circuit 404 can determine whether the object is moving or stationary by comparing static images at two or more time points, thereby obtaining whether the object is a moving object or a stationary object as the action state of the object. When the object is a moving object, the extraction circuit 404 can further classify the state of the moving object based on the speed or the acceleration of the object. If the speed or the acceleration of the object is below a predetermined threshold, the extraction circuit 404 can classify the object as a moving object with first-type movement (moving object that moves slowly). On the other hand, if the speed or the acceleration of the object is greater than the predetermined threshold, the extraction circuit 404 can classify the object as a moving object with second-type movement (moving object that moves violently).

The determination circuit 406 can determine the color or the brightness of each time point of the two or more time points based on a predetermined condition that corresponds the action state of the object to the color or the brightness (correspondence relationship between action states and colors or brightnesses). When the object is a moving object, the determination circuit 406 can determine the object as a first color (e.g., red). When the object is a stationary object, the determination circuit 406 can determine the object as a second color (e.g., blue). When the object is a moving object with first-type movement, the determination circuit 406 can determine the object as a third color (e.g., green). When the object is a moving object with second-type movement, the determination circuit 406 can determine the object as a fourth color (e.g., yellow-green).

By referring to the drag bar generated from the drag bar image generated in accordance with the conditions describe above, it is easy to visually grasp the transition of the dynamic image in scenarios that includes, e.g., the image capturing device 100 is capturing a moving object, the image capturing device 100 is capturing a stationary object, or the image capturing device 100 is capturing a moving object that moves violently, etc.

In some embodiments, the extraction circuit 404 can extract a spatial frequency component of the static images at the two or more time points as the characteristic at each time point of the two or more time points. The determination circuit 406 can determine the color or the brightness of each time point of the two or more time points based on a predetermined condition that corresponds the spatial frequency component to the color or the brightness (correspondence relationship between spatial frequency components and colors or brightnesses). The determination circuit 406 can determine a static image having a spatial frequency component above a predetermined spatial frequency as an image having a sharp change in shade, and determine the color representing the static image is a first color (e.g., red). On the other hand, the determination circuit 406 can determine a static image that does not have a spatial frequency component above the predetermined spatial frequency as an image having a gentle change in shade, and determine the color representing the static image is a second color (e.g., blue).

By referring to the drag bar generated from the drag bar image generated in accordance with the conditions describe above, it is easy to visually grasp the transition of the dynamic image in scenarios that includes, e.g., the image capturing device 100 is capturing an image having a sharp change in shade, or the image capturing device 100 is capturing an image having a gentle change in shade, etc.

In some embodiments, the information acquired in time sequence that is included in the content can further be the information other than the image captured by the image capturing device 100. For example, the information can be the information indicating the capturing state of the image capturing device 100 acquired in time sequence. In some embodiments, the information indicating the capturing state of the image capturing device 100 can include the information that may affect the image captured by the image capturing device 100. In some embodiments, the information indicating the capturing state of the image capturing device 100 can include the information related to the surrounding environment of the capturing of image capturing device 100, where the information related to the surrounding environment of the capturing of the image capturing device 100 can include temperature, humidity, pressure, altitude, etc. around the image capturing device 100. In some embodiments, the information indicating the capturing state of the image capturing device 100 can include the information related to the image capturing condition of the image capturing device 100. In some embodiments, the information indicating the capturing state of the image capturing device 100 can include the information of an exposure condition of the image capturing device 100 capturing a dynamic image, or an subject distance indicating the distance from the image capturing device 100 to the main subject.

In some embodiments, the extraction circuit 404 can extract the capturing state of the image capturing device 100 at the two or more time points as the characteristics at the two or more time points. Specifically, the extraction circuit 404 can extract the exposure conditions or subject distances of the image capturing device 100 at the two or more time points from control information referred to by the imaging controller 110 for controlling the imaging assembly 102 or the lens assembly 200. The determination circuit 406 can determine the color or the brightness of each time point of the two or more time points based on a predetermined condition that corresponds the capturing state of the image capturing device 100 to the color or the brightness (correspondence relationship between capturing states and colors or brightnesses). The determination circuit 406 can determine the brightness of the subject based on the exposure conditions of the image capturing device 100. In some embodiments, when the brightness of the subject during the capturing of a static image is higher than a predetermined brightness, the determination circuit 406 can determine the color representing the static image is a first color. On the other hand, when the brightness of the subject during the capturing of a static image is darker than the predetermined brightness, the determination circuit 406 can determine the color representing the static image is a second color. In some embodiments, when the subject distance of the subject included in the static image is longer than a predetermined distance, the determination circuit 406 can determine the color representing the static image is a first color. On the other hand, when the subject distance of the subject included in the static image is shorter than the predetermined distance, the determination circuit 406 can determine the color representing the static image is a second color.

By referring to the drag bar generated from the drag bar image generated in accordance with the conditions describe above, it is easy to visually grasp the transition of the dynamic image in scenarios that includes, e.g., the image capturing device 100 is capturing an image including a relatively bright subject, or the image capturing device 100 is capturing an image including a relatively dark subject, etc. Or, it is easy to visually grasp the transition of the dynamic image in scenarios that includes, e.g., the image capturing device 100 is capturing an image including a subject that is relatively close, or the image capturing device 100 is capturing an image including a subject that is relatively far, etc.

In some embodiments, the information acquired in time sequence that is included in the content can further be the information indicating the movement state of a movable body that is mounted with the image capturing device 100 and can move. The extraction circuit 404 can extract the information indicating a moving state such as the speed or the acceleration of the movable body from the control unit that controls the movable body as the moving state of the movable body. The determination circuit 406 can determine the color or the brightness at each time point of the two or more time points based on a predetermined condition that corresponds the moving state of the movable body to the color or the brightness (correspondence relationship between moving states and colors or brightnesses). For example, the extraction circuit 404 can extract the flight status of the UAV 10 at the two or more time points as the characteristic at the two or more time points, where the information indicating the flight status of the UAV 10 can include at least one of the altitude, speed, or acceleration of the flight of the UAV 10, or the temperature, humidity, or pressure around the UAV 10. The information indicating the flight status of the UAV 10 can further include the information indicating whether the UAV 10 is moving in the horizontal direction, whether the UAV 10 is ascending or descending, whether the UAV 10 is hovering in the air, whether the UAV 10 is rotating, or whether the UAV 10 is landing, etc.

In some embodiments, the determination circuit can determine the color or the brightness of each time point of the two or more time points based on a predetermined condition that corresponds the flight status of the UAV 10 to the color or the brightness (correspondence relationship between flight statuses and colors or brightnesses). When the height of the UAV 10 during the image capturing device 100 capturing the static image corresponding to the snapshot is higher than a predetermined height, the determination circuit 406 can determine the color representing the static image is a first color. On the other hand, when the height of the UAV 10 during the image capturing device 100 capturing the static image corresponding to the snapshot is lower than the predetermined height, the determination circuit 406 can determine the color representing the static image is a second color.

In some embodiments, when the speed of the UAV 10 during the image capturing device 100 capturing the static image is faster than a predetermined speed, the determination circuit 406 can determine the color representing the static image is a first color. When the speed of the UAV 10 during the image capturing device 100 capturing the static image is slower than the predetermined speed, the determination circuit 406 can determine the color representing the static image is a second color. When the flight status of the UAV 10 during the image capturing device 100 capturing the static image is hovering in the air, the determination circuit 406 can determine the color representing the static image is a third color. When the flight status of the UAV 10 during the image capturing device 100 capturing the static image is rotating, the determination circuit 406 can determine the color representing the static image is a fourth color. When the flight status of the UAV 10 during the image capturing device 100 capturing the static image is landing, the determination circuit 406 can determine the color representing the static image as a fifth color.

By referring to the drag bar generated from the drag bar image generated in accordance with the conditions describe above, it is easy to visually grasp the transition of the dynamic image in which flight status the UAV 10 is capturing images, etc.

Figure 10:
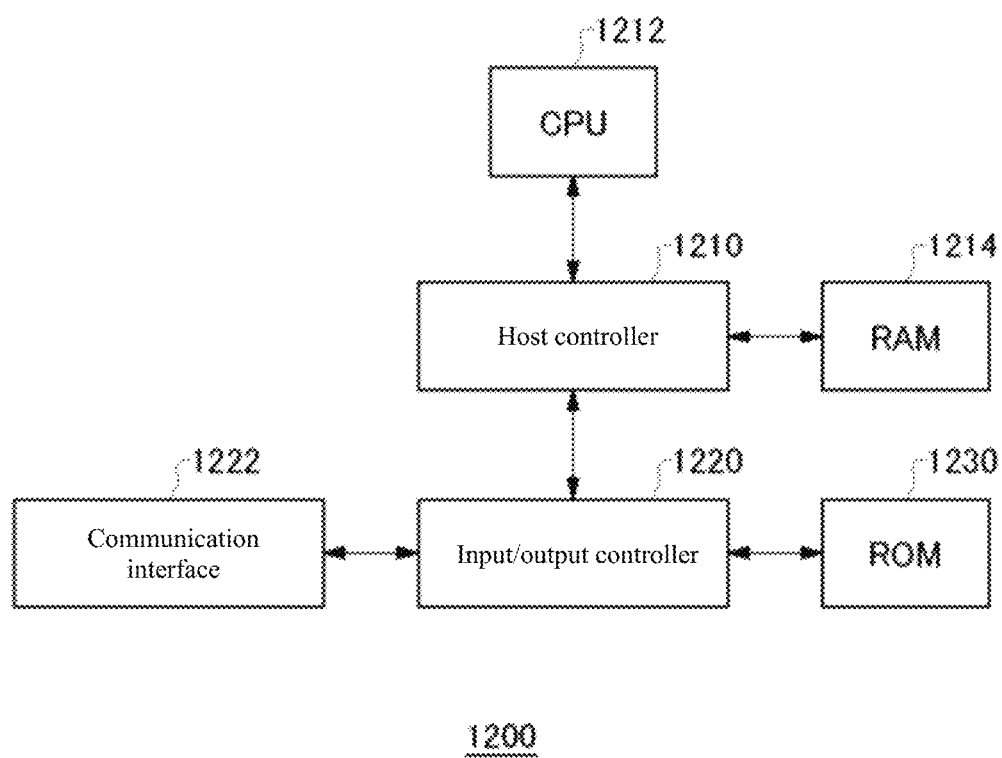
FIG. 10 is a schematic diagram showing the hardware configuration according to an example embodiment.

FIG. 10 shows an example computer 1200 that can implement one or more aspects of the present disclosure in whole or in part. A program installed on the computer 1200 can enable the computer 1200 to perform one or more operations associated with the device according to an embodiment of the present disclosure, or function as one or more components, members, or units of the device. In some embodiments, the program can enable the computer 1200 to execute the operation(s) of the one or more components, members, or units. The program can enable the computer 1200 to execute a process or a stage of the process according to an embodiment of the present disclosure. The program can be executed by a CPU 1212 to enable the computer 1200 to implement specific operations associated with some or all of the flowcharts and block diagrams described in the specification.

The computer 1200 includes the CPU 1212 and a RAM 1214, which are connected to each other through a host controller 1210. The computer 1200 further includes a communication interface 1222 and an input/output circuit, which are connected to the host controller 1210 through an input/output controller 1220. The computer 1200 further includes a ROM 1230. The CPU 1212 can operate in accordance with the program stored in the ROM 1230 and/or the RAM 1214, and control each component/member/unit.

The communication interface 1222 communicates with other electronic devices through a network. The hard disk drive can be configured to store the program and data used by the CPU 1212 in the computer 1200. The ROM 1230 stores therein a boot program etc. executed by the computer 1200 at runtime, and/or a program that depends on the hardware of the computer 1200. The program is provided through a computer-readable storage medium that can include a CD-ROM, a USB memory, or an IC card, or a network. The program is stored in the RAM 1214 or the ROM 1230 that is also an example of the computer-readable storage medium, and is executed by the CPU 1212. The information processing recorded in above described programs can be read by the computer 1200 and leads to a cooperation between the program and the various types of hardware resources described above. The system or method can be constructed by realizing the operation or processing of the information according to the use of the computer 1200.

For example, when the computer 1200 communicates with an external device, the CPU 1212 can execute a communication program loaded in the RAM 1214, and the communication interface 1222 can implement communication processing based on the processing recorded in the communication program. The communication interface 1222 reads the transmitted data stored in a transmission buffer provided in a storage medium such as the RAM 1214 or a USB memory under the control of the CPU 1212, and send the transmitted data being read to the network, or write the received data received from the network into a receiving buffer etc. provided in the storage medium.

In some embodiments, the CPU 1212 can cause the RAM 1214 to read all or required parts of a file or database stored in an external storage medium such as a USB memory, and implement various types of processing on the data on the RAM 1214. The CPU 1212 can write the processed data back to the external storage medium.

In some embodiments, various types of information including various types of programs, data, tables, and databases can be stored in a storage medium and subjected to information processing. For the data read from the RAM 1214, the CPU 1212 can implement various types of processing described throughout the disclosure and also specified by the instruction sequence of the program including various types of operations, conditional judgment, conditional transfer, unconditional transfer, and information retrieval/replacement, etc., and write the result back to the RAM 1214. The CPU 1212 can further retrieve information in files, databases, etc. in the recording media. For example, when two or more entries having the attribute value of the first attribute associated with the attribute value of the second attribute respectively are stored in the storage medium, the CPU 1212 can retrieve the entry that matches the condition of the attribute value of the specified first attribute from the two or more entries, and read the attribute value of the second attribute stored in the entry, thereby obtaining the attribute value of the second attribute associated with the first attribute that meets the predetermined condition.

The programs or software modules described above can be stored on the computer 1200 or a computer-readable storage medium coupled to the computer 1200. A storage medium provided in a server system connected to a special-purpose communication network or the Internet including a hard disk or a RAM can be used as a computer-readable storage medium, thereby providing the program to the computer 1200 through the network.

It should be noted that, unless being specifically stated "before . . . ," "in advance," etc., and as long as the output of the previous processing is not used in the subsequent processing, the order of execution of the processes including actions, sequences, steps, and stages in the devices, systems, programs, and methods shown in the claims, the specification, and the drawings can be implemented in any order. In the operation flows in the claims, the specification, and the drawings, "first," "next," etc., have been used for convenience, but it does not mean that the order must be implemented.

The present disclosure has been described with the above embodiments, but the technical scope of the present disclosure is not limited to the scope described in the above embodiments. Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the claims.

What is claimed is:

1. A device comprising:
   a memory storing a computer program; and
   a processor configured to read the computer program to:
   obtain a dynamic image including information acquired in a time sequence, the dynamic image being captured by an image capturing device mounted at a movable body, and the information indicating movement states of the movable body acquired in the time sequence;
   extract characteristics at a plurality of time points from the information, the characteristics including the movement states of the movable body at the plurality time points;
   determine a color or a brightness at each of the plurality of time points based on the characteristic at the time point, including:
   determining the color or the brightness at each of the plurality of time points based on a correspondence relationship between movement states and colors or brightnesses; and
   generate drag bar images each corresponding to one of the plurality of time points and including a pixel having the color or the brightness at the one of the plurality of time points.

2. The device of claim 1, wherein:
   the processor is further configured to read the computer program to extract the characteristics at the plurality of time points from static images at the plurality of time points in the dynamic image.

3. The device of claim 2, wherein: the characteristics further include pixel values of the static images at the plurality of time points.

4. The device of claim 3, wherein the processor is further configured to read the computer program to, for each of the plurality of time points:
   extract pixel values of pixels in a first direction of a static image at the time point;
   average the pixel values of the pixels in the first direction; and
   generate the drag bar corresponding to the time point by:
   replacing the pixels in the first direction of the static image with a predetermined number of pixels having the color or the brightness; and
   compressing pixels in a second direction of the static image at a predetermined compression ratio.

5. The device of claim 2, wherein:
   the characteristics further include a color or a brightness of an object in the corresponding static image that satisfies a predetermined condition.

6. The device of claim 2, wherein:
   the characteristics further include an action state of an object in the corresponding static image that satisfies a predetermined condition.

7. The device of claim 2, wherein:
   the characteristics further include a spatial frequency component of the static image at the time point.

8. The device of claim 1, wherein:
the information further indicates capturing states of the image capturing device acquired in the time sequence.

9. The device of claim 1, wherein:
the movable body includes an aerial body; and
the movement states of the movable body include flight statuses of the aerial body.

10. The device of claim 1, wherein the processor is further configured to read the computer program to:
acquire the drag images corresponding to the time points; and
arrange the drag images in the time sequence to generate a drag bar corresponding to the dynamic image.

11. The device of claim 10, wherein:
the dynamic image is captured by the image capturing device between a first time point and a second time point; and
the drag bar images include:
a first drag bar image at one end of the drag bar and corresponding to a static image at the first time point in the dynamic image; and
a second drag bar image at another end of the drag bar and corresponding to a static image at the second time point in the dynamic image.

12. The device of claim 10, wherein:
the dynamic image is captured by the image capturing device between a first time point and a second time point; and
the drag bar images include:
a first drag bar image at one end of the drag bar and corresponding to a static image at a third time point in the dynamic image, the third time point being a time point between the first time point and the second time point and being at a predetermined period before the second time point; and
a second drag bar image at another end of the drag bar and corresponding to a static image at the second time point in the dynamic image.

13. The device of claim 10, wherein:
the dynamic image is captured by the image capturing device between a first time point and a second time point; and
the drag bar images include:
a first drag bar image at one end of the drag bar and corresponding to a static image at the first time point in the dynamic image,
a second drag bar image at another end of the drag bar and corresponding to a static image at the second time point in the dynamic image, and
a third drag bar image at a predetermined part between two ends of the drag bar and corresponding to a static image at a third time point in the dynamic image, the third time point being a time point between the first time point and the second time point and being at a predetermined period before the second time point.

14. The device of claim 10, wherein the drag bar includes information indicating a position of a time point at which a status of the dynamic image transits.

15. A system comprising:
the device of claim 1; and
a terminal configured to:
acquire the drag bar images corresponding to the time points;
arrange the drag bar images in the time sequence to generate a drag bar corresponding to the dynamic image; and
display the drag bar.

16. A system comprising:
the image capturing device; and
the device of claim 1.

17. A movable body comprising:
a propulsion system;
an image capturing device; and
an image generation device including:
a memory storing a computer program; and
a processor configured to read the computer program to:
obtain, from the image capturing device, a dynamic image including information acquired in a time sequence, the information indicating movement states of the movable body acquired in the time sequence;
extract characteristics at a plurality of time points from the information, the characteristics including the movement states of the movable body at the plurality time points;
determine a color or a brightness at each of the plurality of time points based on the characteristic at the time point, including:
determining the color or the brightness at each of the plurality of time points based on a correspondence relationship between movement states and colors or brightnesses; and
generate drag bar images each corresponding to one of the time points and including a pixel having the color or the brightness at the one of the time points.

18. A method comprising:
obtaining a dynamic image including information acquired in a time sequence, the dynamic image being captured by an image capturing device mounted at a movable body, and the information indicating movement states of the movable body acquired in the time sequence;
extracting characteristics at a plurality of time points from the information, the characteristics including the movement states of the movable body at the plurality time points;
determining a color or a brightness at each of the plurality of time points based on the characteristic at the time point, including:
determining the color or the brightness at each of the plurality of time points based on a correspondence relationship between movement states and colors or brightnesses; and
generating drag bar images each corresponding to one of the time points and including a pixel having the color or the brightness at the one of the time points.

* * * * *